United States Patent [19]

Sugisawa et al.

[11] Patent Number: 4,520,574
[45] Date of Patent: Jun. 4, 1985

[54] PROCESS FOR DRYING FOODS UNDER REDUCED PRESSURE

[75] Inventors: Ko Sugisawa; Yasushi Matsumura, both of Nara; Kazumitsu Taga, Neyagawa, all of Japan

[73] Assignee: House Food Industrial Co., Ltd., Osaka, Japan

[21] Appl. No.: 554,862

[22] Filed: Nov. 23, 1983

[30] Foreign Application Priority Data

Feb. 25, 1983 [JP] Japan .................................. 58-31690
Feb. 25, 1983 [JP] Japan .................................. 58-31691
Mar. 3, 1983 [JP] Japan .................................. 58-34925

[51] Int. Cl.³ .......................... F26B 5/06; F25B 19/00
[52] U.S. Cl. ......................................... 34/5; 62/268
[58] Field of Search ...................... 34/5; 426/384, 385; 62/268

[56] References Cited

U.S. PATENT DOCUMENTS 2,653,100 9/1953 Carman .................................. 99/82
3,085,012 4/1963 Wayne ..................................... 34/5
3,438,792 4/1969 Kruger ..................................... 35/5

FOREIGN PATENT DOCUMENTS

5176 3/1967 Japan .

Primary Examiner—John J. Camby
Attorney, Agent, or Firm—Weiss & Holloway

[57] ABSTRACT

A process for drying a food under a reduced pressure is provided for the preparation of a dried food which may be rehydrated to the original condition in a very short time to have pleasant taste and texture substantially comparable to an untreated food. The process is characterized by the step of placing the food to be dried in an environment of reduced pressure low enough to vaporize a portion of the water contained in the food and to freeze the balance of water by the radiation of heat by the vaporization, and the step of heating to dry the food at relatively low temperature under the reduced pressure. A further characteristic feature of the process of the invention is the sudden or abrupt drop of the pressure surrounding the food at the initial stage, whereby the food is puffed somewhat by the action of the vigorously vaporizing water to a dried state with a substantially hollow core portion and a denser surface layer.

12 Claims, 8 Drawing Figures

PROCESS FOR DRYING FOODS UNDER REDUCED PRESSURE

BACKGROUND OF THE INVENTION

The present invention relates generally to a process for drying foods under a reduced pressure, and more particularly it relates to such a process for the preparation of dried foods which may be rehydrated to the original condition in a short time and have a pleasantness of taste and texture substantially comparable to untreated foods and also to the dried food processed through said process.

A variety of foods, in Japan so-called instant foods, which may be rehydrated simply by the addition of hot water or like means has heretofore been developed and commercially supplied. Multifarious efforts have been paid to develop more improved techniques for drying foods. As the outcomes of such efforts, various drying processes have been proposed, the representative examples being the hot air drying process, the micro-wave drying process, the freeze-dry process, the drying process and the process for drying the foods under reduced pressure. A swelling-drying process has also been proposed, in which a food to be dried is exposed to a flow of superheated steam for a while followed by heating to dehydrate the same and then placing the dehydrated food in the atmosphere abruptly to form a swelled product.

However, the dried foods processed through any of the known processes are not satisfactory, particularly in the taste and texture thereof after restoration. It cannot be said that the foods dried and then restored, according to the known processes have a taste and texture substantially comparable to those prior to treatment, since the former are inferior to the later in that they have a lack of springiness, are hard at the center portions, and have lost inherent adhesiveness and deteriorated in stiffness.

A further disadvantage of the foods or snack foods prepared from the known dried foods is that they have unpleasant odors caused by the heating at the drying step, or the flavour and taste thereof are lost or deteriorated. The last mentioned disadvantage causes serious problems from the commercial view-point particularly when the snack or fast food products are those which are eaten for their fresh flavour or taste, for example fruit snack products.

SUMMARY OF THE INVENTION

After various efforts to eliminate the aforementioned disadvantages of the prior art processes for drying foods, we have found that such disadvantages may be excluded by placing the foods under a reduced pressure to allow them to puff. The present invention has been accomplished based on the finding referred to above.

Accordingly, a principal object of this invention is to provide a novel process for drying foods.

Another object of this invention is to provide a novel dried food and a process for preparing the same, the dried food being rehydrated to the original condition within a short time and the thus rehydrated food having pleasant taste, texture and flavour comparable to those of the fresh, untreated food.

The above and other objects of this invention can be attained, according to the invention, by the provision of a process comprising the steps of placing the food to be dried in an environment of reduced pressure low enough to vaporize a portion of the water contained in the food and to freeze the balance of said water by the radiation of heat by the vaporization, heating the thus frozen food to dry it, and returning the environment surrounding the food to atmospheric pressure.

All of the aforementioned disadvantages of the prior art processes can be, thus, obviated by the invention so that dried foods of superior properties are prepared thereby.

DETAILED DESCRIPTION OF THE INVENTION

A variety of foods may be processed or treated through the process of this invention, and particularly preferred foodstuffs are those having the water content of not less than 50%, by weight, based on the total weight thereof, the examples being vegetables, fruits, cereals, dough prepared from cereals, animal meats, processed animal meats such as ham or sausage, marine products such as fish meats, shellfish, lobster, prawn, shrimp or marine plants, processed marine products, mushroom or like edible fungi, processed eggfoods such as eggrolls with or without additive, and mixtures of the foodstuffs referred to above.

According to the process of the invention, any one or more of the aforementioned foods are placed in an environment of reduced pressure so that the pressure internally of the food is reduced to a level at which water contained therein is frozen. This phenomenon may be explained as follows. The boiling point of water is lowered with the pressure drop so that water contained in the foods vaporizes, the vaporization draws heat from the food and the residual water. As the result, the temperature of the contained water is lowered abruptly and frozen. This phenomenon occurs at a pressure of about 611 pascals (4.58 Torr) resulting in the freezing of water. Accordingly, the pressure employed at the first step of the process of the invention should be lower than about 611 pascals (4.58 Torr), and preferably lower than about 107 pascals (0.8 Torr).

By holding the food at a pressure within the aforementioned range, a portion of the water contained in the food is allowed to vaporize, releasing heat so that the balance of water contained originally in the food is frozen.

According to the present invention, the food is swelled or expanded by the vigorously vaporizing water and then dried while retaining the swelled condition. This is a very important aspect of the invention for obtaining a snack food product excellent in rehydration properties to give pleasant taste and texture after being rehydrated. For this reason, in the process of the invention, a portion of water contained in the food is vaporized to freeze the residual water, thereby swelling the food concurrently with the development of frozen state, and the food is maintained in this swelled, frozen state throughout the subsequent steps.

It is preferable that 10 to 60%, by weight, of the water content, based on the weight of the water content originally contained in the untreated food be vaporized at the first step. If the water content evaporating from the food is less than the defined range, the swelling of the food is not sufficient. On the other hand, if the water content evaporating from the food exceeds the 60%, by weight, the volume of frozen water still residing in the food becomes too small to retain the swelled condition.

In order for the extent of swelling of the food to become more appreciable, it is preferred that the environment surrounding the food is decompressed to a level low enough to freeze the residual water and that this reduction on pressure of the environment to the destination level is rapid, as will be described in detail hereinbelow, at which level the boiling point of water is lower than the temperature of the processed food.

As has been well-known in the art, the boiling point of water drops with the decline in the pressure of the surrounding environment, so water contained in a food, particularly free water therein, vaporizes when the food is placed in a reduced-pressure environment. Swelling or expansion of the food takes place in a very short time, if the contained water is vaporized suddenly in a very short time by rapidly reducing the pressure of the environment. However, the swelling of the food by the action of the vaporizing water differs depending on the kind of the food. Subsequently, the rate of pressure drop for inducing the swelling is changed depending on the kind of the food being processed. In general, it is desirous that the sudden pressure drop be realized from one level to the destination level within one second.

Three methods have been conceived of reducing the pressure to the destination level at which the boiling point of the water contained in the food is lowered below the temperature of the food being processed. Namely, the first method comprises the step of reducing the pressure rapidly at one time from the atmospheric pressure to the destination pressure. The second method comprises the step of reducing the pressure slowly from the atmospheric pressure to an intermediate level at which the boiling point of water contained in the food becomes substantially equal to the temperature of the food being processed, and the step of suddenly lowering the pressure from the intermediate level to the destination level at which the boiling point of water contained in the food is appreciably lower than the temperature of the food. The third method comprises the step of reducing the pressure slowly from the atmospheric pressure to a certain intermediate level at which the boiling point of water contained in the food goes below the temperature of the food, and the step of further reducing the pressure from the intermediate level of the destination level suddenly at a rapid rate.

However, it was found that the first and second methods were preferred in view of their efficiency for swelling the food. It is preferable that the pressure is reduced to the destination level at which the boiling point of water contained in the food is lowered rapidly to a temperature at least 5° C. below that of the temperature of the food. It is also preferable that the temperature of the food prior to processing is within the range of from 5° C. to 100° C.

After swelling the food and concurrently freezing the remaining water, the frozen food is subjected to a heating step for drying. Heating may be effected by any known means, such as by infrared rays or by micro waves.

If the water in the frozen state is vaporized after it is completely melted, at this step of heating the frozen food to be dried, the food in the swollen condition tends to shrink. On the other hand, if the water in the frozen state is sublimated, at this step, the dried food obtained is unsatisfactory, formed such that the texture and taste of the food after restoration with hot water tends to differ from those of the restored food which has not been subjected to drying by sublimation. Particularly, if the final product is a snack food, the feel or texture perceived by a person who eats the rehydrated food tends to differ from those aimed at by the present invention.

Accordingly, it is preferred that frozen water contained in the food be so vaporized so that the frozen water is neither completely melted nor the frozen water allowed to sublimate, in order to obviate both of the aforementioned disadvantages. The most preferable heating means is radiatiant heating by the use of, for example, infrared rays. After that the environment surrounding the dried food subsequent to the heating step is returned to the atmospheric pressure, and then the dried food is moved to the packaging or other steps.

The process of the invention will be described more specifically by referring to an embodiment where boiled rice is processed thereby. Firstly, polished rice is washed with water, placed in water and then boiled by a conventional method. Prior to processing the boiled rice for drying and swelling the same, according to the process of the invention, it is desirous that the boiled rice is again washed with water followed by pre-drying. The boiled rice is washed with water to remove pasty substances adhering to individual rice grains, thereby to prevent the boiled rice grains from adhering to each other to form aggregates or lumps. The method of washing the boiling rice is not critical as long as the aforementioned object of removal of pasty substance is attained. The water content of the boiled rice is increased by washing, as a matter of course, as it includes the weight of water adhering to the rice. The boiled rice after washing is subjected to a pre-drying step to control the water content thereof to the value substantially equal to that contained in the boiled rice prior to the washing step.

The temperature of the thus boiled and washed rice, just before processing the same by the process of the invention, should be 5° C. to 100° C., preferably 30° C. to 100° C. Within this range a higher temperature is preferred for promoting the swelling at the first step of the process of this invention.

The boiled rice is swelled under a reduced pressure under the essential conditions (1) that the pressure of the surrounding environment should be lower than about 600 pascals (about 4.5 Torr), preferably lower than about 107 pascals (about 0.8 Torr), and (2) that the pressure of the surrounding environment should be lowered from the atmospheric pressure to the destination pressure within one second. By subjecting the boiled rice to the swelling under reduced pressure under the aforementioned conditions, water contained in the boiled rice is vaporized suddenly to swell or expand the boiled rice grains and concurrently to freeze the unvaporized water so that the boiled rice grains are retained in the swelled condition by the frozen water.

Figure 1:
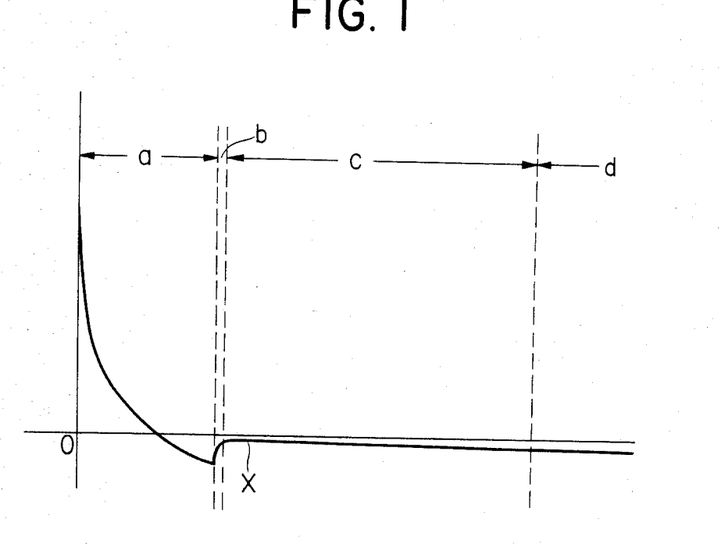
FIG. 1 is a graphic representation of the change in temperature of foods with the lapse of time at the step of swelling the same under reduced pressure.

FIG. 1 shows the change in temperature of the boiled rice with the lapse of time at the step of maintaining the boiled rice in a reduced pressure environment to be swelled. In the Figure, the ordinate represents the temperature in degrees centigrade, the abscissa represents the time in minutes for the swelling under reduced pressure, and the curve shows the change in temperature of the boiled rice. When the boiled rice is processed under the aforementioned conditions, the temperature of the boiled rice is lowered abruptly, as shown by (a), to reach a supercooled state under which water contained in the boiled rice is vaporized suddenly, the vaporization drawing heat from the boiled rice, whereupon the boiled rice grains are swelled or inflated by the action of the vigorously vaporizing water. Thereafter, the temperature of the boiled rice is raised once to some extent, as shown by (b), by the heat energy generated by the freezing of the water in the supercooled state. After a while, the temperature of the boiled rice is lowered slowly, as shown by (c), presumably owing to slow sublimation of frozen water contained in the frozen rice. After the sublimation shown by (c) ceases, the temperature of the rice was maintained at a constant level, as shown by (d). It is preferred that the boiled rice is heated for the drying during the stage (d), however the object of the invention may also be attained by drying it during the stage (c). Usable means for drying at this step include heating by radiation, heating by conduction or heating by microwave, and the heating is continued until the boiled rice reaches normal temperature. After the completion of the heating and drying step, the swelled rice is removed as a product.

Curves similar to those shown in FIG. 1 for boiled rice are obtained for foods other than boiled rice.

In order to facilitate the clear understanding of the merits of the process of the invention, comparison experiments will be described hereinafter. Prior to referring to the comparison experiments, an embodiment of the apparatus used in the comparison experiments will be described with reference to FIG. 2. However, it should be noted that the apparatus shown in FIG. 1 is illustrated, by way of example, as one embodiment of the apparatuses which may be used for the practical operation of the process of the invention, and thus the present invention is not limited only to the user of the illustrated apparatus.

Figure 2:
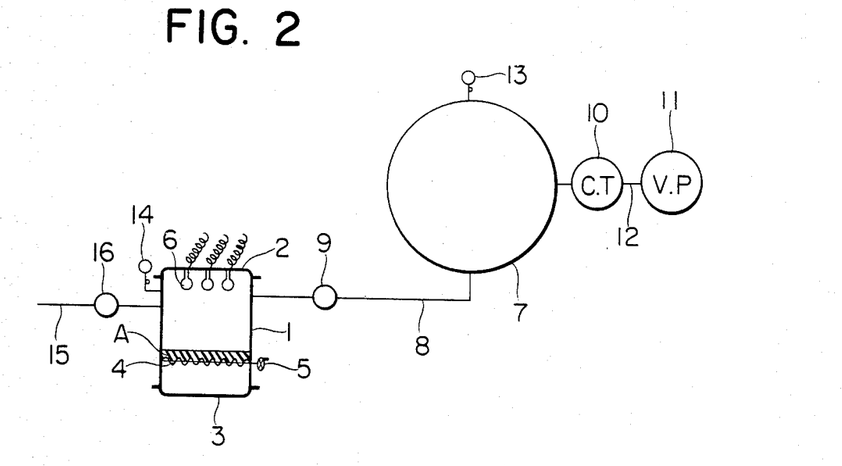
FIG. 2 is a schematic view showing one embodiment of the apparatus which may be used for practical operation of the process of the invention.

Now, referring to FIG. 2, a drying chamber 1 has an upper portion and a lower portion provided, respectively, with lids 2 and 3, and shelf 4 is disposed in the drying chamber 1 to receive thereon the food A. The shelf 4 may be rotated by means of a handle 5. An infrared ray lamp 6 is provided on the inside face of the lid 2 of the drying chamber 1. The drying chamber 1 is communicated with a vacuum chamber 7 through a pipe 8 attached to the side wall of the chamber 1. As shown, a cock 9 for opening and closing one end of the pipe 8 is provided to communicate or discommunicate the chamber 1 and the chamber 7. The vacuum chamber 7 is connected to a cold trap 10 and a vacuum pump 11 for evacuating the vacuum chamber 7 throurh a pipe 12, and provided with a vacuum gauge 13. Another vacuum gauge 14 is provided on one wall of the drying chamber 1 for measuring pressure in the chamber 1. Another pipe 15 is connected to the chamber 1 for supplying air thereto, and provided with a cock 16 for opening and closing the air supply pipe 15.

The following comparison experiments were conducted using the apparatus described above.

COMPARISON EXPERIMENT 1

Process (1) of the Invention 100 g of boiled rice cooked normally, by the use of an electric rice cooker was placed on the shelf 4 of the drying chamber 1 and the lid 2 closed. The temperature of the boiled rice was about 40° C. The vacuum pump 11 was actuated with the cock 9 in the closed position to evacuate the vacuum chamber 7 until the pressure in the vacuum chamber 7 reached about 67 pascals (0.5 Torr). After the completion of the above operations, the cock 9 was opened while maintaining the cock 16 in the closed position, whereupon air in the drying chamber 1 flowed through the air pipe 8 to the vacuum chamber 7 so that the pressure in the drying chamber 1 and the pressure in the vacuum chamber 7 rapidly equalized (in less than one second). The pressure that developed in both chambers was about 33 pascals (about 2.5 Torr). Immediately after, the pressure in the drying chamber 1 was lowered to about 67 pascals (about 0.5 Torr) by means of the vacuum pump 11, and maintained at that pressure until the end of the drying step. During those steps, the temperature of the boiled rice contained in the drying chamber 1 changed, as shown in FIG. 1. After holding the boiled rice under the reduced pressure for 3 minutes, the infrared ray lamp (100 V, 185 W, Distance: 10 cm) was switched on at a time shown by X in FIG. 1, to dry the boiled rice, until the temperature thereof reached about 30° C. Then the cock 9 was closed, the vacuum pump 11 was switched off and the cock 16 was opened slowly to return the pressure in the drying chamber 1 to the atmospheric pressure. Thereafter, the lid 3 was opened and the shelf 4 was inverted by rotating the handle 5 to remove the dried boiled rice.

Process (2) of the Invention

Similar procedures to the process (1) of the invention were repeated, except that a heat conductor shelf (maintained at 30° C.) was used in place of the infrared ray lamp.

Conventional Freeze-Drying Process 100 g of the same boiled rice cooled normally in a process similar to that described in the process (1) of the invention was frozen at −40° C. under normal pressure, and then the frozen rice was placed on the heat conductor shelf to subject the same to freeze-drying under the conditions of about 67 pascals (0.5 Torr) in pressure and 30° C. in temperature until the temperature of the boiled rice reached about 30° C. Then the pressure in the chamber was returned to the normal pressure and the dried rice was removed from the chamber.

Sections of the dried boiled rice grains prepared by each of the three processes were observed through an electronic microscope. The photographs taken are shown in FIGS. 3 to 8.

Figure 3:
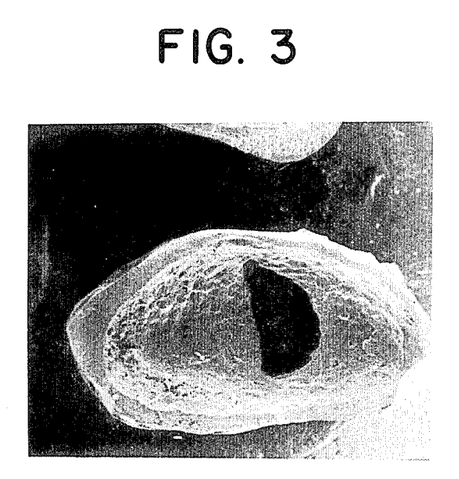
FIGS. 3 to 8 are photographs taken through an electron microscope, each showing a section of boiled and dried rice prepared in Comparison Experiment 1, the magnification being 30 times for FIG. 3, FIG. 5 and FIG. 7 and 150 times for FIG. 4, FIG. 6 and FIG. 8.
Figure 4:
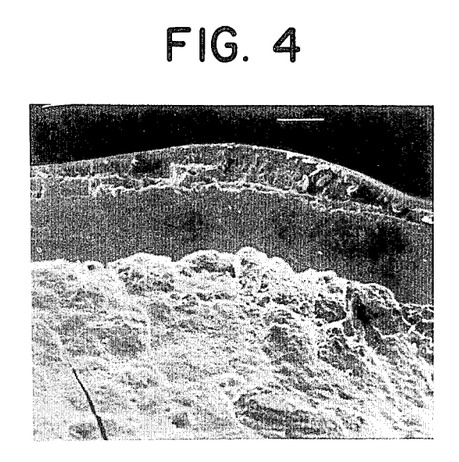
Figure 5:
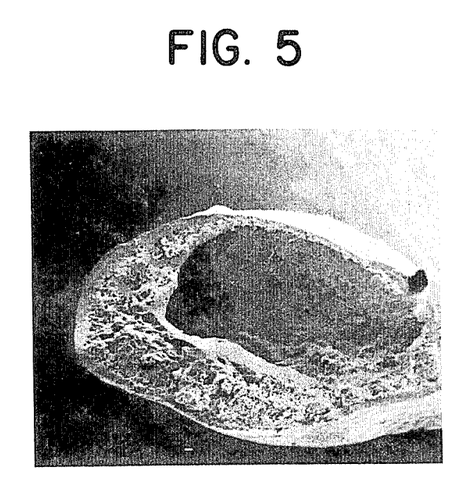
Figure 6:
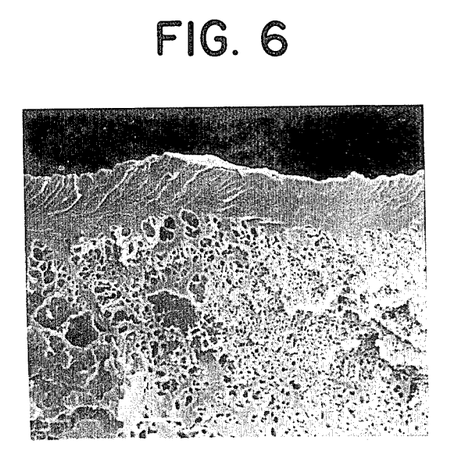
Figure 7:
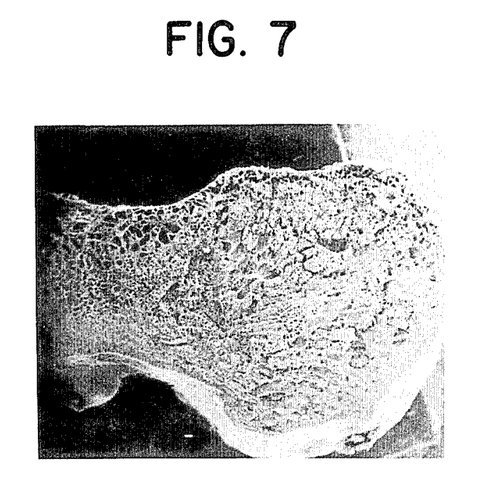
Figure 8:
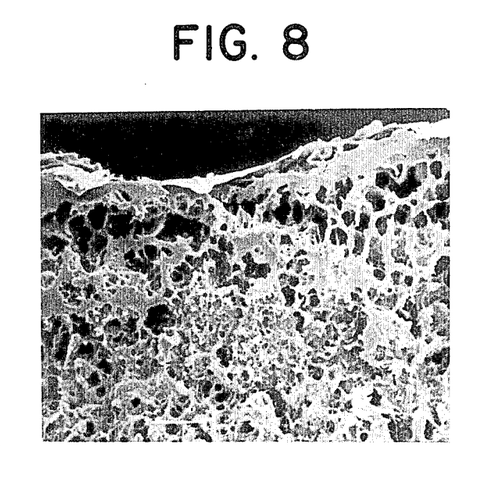

FIG. 3 is a photograph showing the section of boiled rice after being dried by the process (1) of the invention, whereas FIG. 4 is a photograph showing the enlarged view of the surface layer of the rice boiled then dried shown in FIG. 3. FIG. 5 is a photograph showing the section of boiled rice after being dried by the process (2) of the invention, whereas FIG. 6 is a photograph showing the enlarged view of the surface layer of the rice boiled and then dried shown in FIG. 5. FIG. 7 is a photograph showing the section of boiled rice after being dried by the conventional freezed-dry process whereas FIG. 8 is a photograph showing the enlarged view of the surface layer of the rice boiled and then dried shown in FIG. 7.

It can be seen by comparing the photographs of FIGS. 3 to 8 that the major core portions of the boiled and dried rice grains processed through the processes (1) and (2) of the invention become hollow with the surface layers having dense structure, whereas the boiled and dried rice grain processed through the conventional freeze-drying process has a porous structure having fine pores in its entirety including the surface layer.

Owing to such difference, the following differences result after the boiled and dried rice particles are rehydrated by the addition of hot water. Since the boiled and dried rice grains prepared through the conventional freeze-dry process have porous structures in their entireties, as aforementioned, and have relatively small densities, they tend to float up to the surface of hot water when hot water is poured onto them so that it is hard to ensure all boiled and dried rice grains are uniformly contacting the hot water, leading to uneven rehydration thereof. Moreover, since the boiled and dried rice grains have porous structures in their entireties, during the absorption of hot water, the surface layer of each grain as initially rehydrated becomes pasty, hindering and retarding penetration of hot water, whereby the time required for complete restoration of the dried rice is increased.

In contrast thereto, since the boiled and dried rice grains prepared through the processes (1) and (2) of the invention have relatively high densities, they do not float up to the surface of the hot water or tend to settle again even if they do float to the surface, all of the boiled and dried rice grains uniformly contact the hot water. As a result, the boiled and dried rice may be rehydrated substantially evenly. Furthermore, since the boiled and dried rice grain prepared according to the invention have substantially hollow core portions and denser surface structures as compared to the surface layers of the rice grains prepared through the conventional process, hot water penetrates rapidly into the hollow inside portion of each boiled and dried rice grain so that the dense surface layer of each grain is attacked by hot water from both of the inside and outside. As a result, the time required for rehydration thereof is decreased.

In order to demonstrate the advantageous effects obtained at the step of rehydrating boiled and dried rice processed in accordance with the present invention by the addition of water, a comparison experiment was conducted, the details of which are given below.

COMPARISON EXPERIMENT 2

Eight grams of each of the boiled and dried rices prepared through the three processes as set forth in Comparison Experiment 1, i.e., prepared through the process (1) of the invention, process (2) of the invention and the conventional process (3), were put into beakers and 150 g of boiling water added. After 5 minutes with the beakers covered, the excess water was removed from each beaker and the beakers closed and allowed to stand for an additional 10 minutes to remove each of the three boiled and dried rices. The results of comparisons are shown in Table 1.

TABLE 1

| Comparison Item | Process (1) of the Invention | Process (2) of the Invention | Conventional Freezed-Dry Process |
| --- | --- | --- | --- |
| (a) | Substantially Transparent | Major portion was transparent with little white portion. | Entirely White |
| (b) | More than two-thirds settled. | Approximately half of the grains settled. | All grains were not settled |
| (c) | 2 minutes and 1 second | 3 minutes and 4 seconds | 4 minutes |
| (d) | Transparent | Major portion was transparent with little white portion | White with No transparent Portion |
| (e) | Same Taste and Flavour as the Directly cooked Rice | Somewhat Inferior to the Taste and Flavour of Directly cooked Rice | Quite Different from the Taste and Flavour of the Directly Cookded Rice with the Surface Portions and Hard Core Portion |
| (f) | Slightly Muddy | Muddy to Some Extent | Very Muddy |

Comparison Item:
(a): Appearance of Boiled and Dried Rice
(b): Ratio of the portion settling imediately after the addition of boiling water
(c): Time required for complete settling of all boiled and dried rice particles in the boiling water
(d): Appearance of the rehydrated condition
(e): Taste and flavour after the rehydrated condition
(f): Condition of boiling water when it was slowly stirred by a rod just before the rehydration of the boiled and dried rice In Table 1, Comparison Item (a) is for the clarification of difference in appearance of the boiled and dried rice grains depending on difference in drying means; Comparison Item (b) is for the information on the densities of the boiled and dried rice; Comparison Item (c) shows the water absorption rate of each boiled and dried rice; Comparison Item (d) is for the clarification of difference in appearance of the boiled and dried rice after rehydration; Comparison Item (e) is for the clarification of difference in taste and flavour of the boiled and dried rice after rehydration; and Comparison Item (f) is for the information of the ratio of dissolved pasty starch during the rehydration step.

Comparing the results shown in Table 1, the differences between the aforementioned three kinds of boiled and dried rice after rehydration can be appreciated.

In Comparison Experiment 1, Process (1) of the Invention includes the step of vaporing water, neither allowing the frozen water to melt completely nor allowing sublimation thereof while retaining the water in a semi-frozen state during the step of heating to dry the frozen rice grains, whereas Process (2) of the Invention includes the step of vaporizing water by sublimation. Similar tendencies were observed when the foods other than boiled rice were processed.

As has been described hereinbefore, the dried foods prepared by the process of the invention are swelled or expanded to a proper extent while retaining their inherent properties, and may be rehydrated completely and substantially uniformly within a relatively short time, for example by the addition of hot water, to give taste and texture substantially unchanged from or approximate to those prior to processing, by the process of this invention. A further merit of this invention resides in that deterioration in quality of food due to heating can be minimized because the food is subjected to a relatively low temperature under a reduced pressure to swell and dry it.

The process of the invention may be utilized for the production of swelled or inflated snack foods, and it is expected that novel snack products may be produced thereby.

EXAMPLE 1

A carrot was swelled and dried under a reduced pressure using the apparatus shown in FIG. 2. The carrot was cut into 2 mm slices and then dipped in water maintained at about 40° C. for 30 minutes, whereby the temperature of the sliced carrot reached about 30° C. The sliced carrot pieces were put on the shelf 4 in the drying chamber 1 so that the shelf 4 was covered entirely with a single layer of carrot slices, and then the lid 2 was closed. The vacuum pump 11 was operated with the cock 9 at the closed position to evacuate the vacuum chamber 7 to a pressure of about 17 pascals (about 0.2 Torr). After the completion of above operations, the cock 9 was opened while maintaining the cock 16 in the closed position, whereupon the pressure in the dyring chamber 1 was reduced to about 160 pascals (about 1.2 Torr) within one second. Then the pressure in the drying chamber 1 was immediately reduced to about 27 pascals (about 0.2 torr) by means of the vacuum pump 11 and maintained at that pressure during the subsequent drying step. After allowing the carrot slices to stand at that pressure for 15 minutes, the infrared ray lamp (100 V. 185 W, Distance: 10 cm) was turned on to irradiate the carrot slices to dry the carrot slices until the temperature thereof reached about 30° C. Thereafter, the cock 9 was closed and the vacuum pump was stopped, and the cock 16 was opened slowly to return the pressure in the drying chamber 1 to atmospheric pressure. The lid 3 was then opened and the shelf 4 was inverted by rotating the handle 5 to remove the dried carrot slices.

EXAMPLE 2

Process of the Invention

One kilogram of segmental chips of apple was prepared by removing the rinds and cores of fresh apples and cutting the apples into pieces each having a thickness of 4 mm, a short arc of 10 mm, a long arc of 25 mm and a width of 20 mm, using a slicer. The sliced apple pieces were treated with about 4 kg of a syrup solution containing 0.8 kg of sucrose, 0.01 kg of L-ascorbic acid and 3.18 kg of water by dipping the former in the latter under normal temperature and pressure conditions 100 g of the apple pieces thus prepared were put on the shelf 4 in the drying chamber 1, and then the lid 2 was closed. The vacuum pump 11 was operated while maintaining the cock 9 in the closed position to evacuate the vacuum chamber 7 to a pressure of about 66.5 pascals (about 5 Torr). After the completion of the above operations, the cock 9 was opened while maintaining the cock 16 in the closed position, whereupon air in the drying chamber 1 flowed through the pipe 8 so that the pressure in the drying chamber 1 and that in the vacuum chamber 7 equalized within a very short time (within one second). The pressure in both chambers was about 3325 pascals (about 25 Torr). The pressure in the drying chamber was reduced immediately by means of the vacuum pump 11 to a pressure of about 66.5 pascals (about 0.5 Torr) and maintained at that pressure during the subsequent drying step. The temperature of the apple pieces in the drying chamber 1 was changed during the aforementioned operations as shown in FIG. 1. After subjecting the apple pieces to the reduced pressure for 3 minutes, the infrared ray lamp (100 V, 185 W, Distance: 10 cm) was turned on at the time shown by X in FIG. 1 to dry the apple pieces until the temperature thereof reached about 30° C. Then a cock 9 was closed and the vacuum pump 11 was stopped, and the cock 16 was opened slowly to return the pressure in the drying chamber 1 to the atmospheric pressure, followed by the opening of lid 3 and the inversion of the shelf 4 by rotating the handle 5, to remove the dried apple pieces.

Conventional Freezed-Dry Process

About 100 g of apple pieces prepared by the same manner as used in the process of the invention were freezed-dried for 4 hours under the condition of about 13.3 pascals (about 0.1 Torr) in pressure and of not more than 30° C. in increase of temperature, whereby a dried apple product containing about 5 wt% of water was produced.

Conventional Reduced Pressure Microwave Drying Process

About 100 g of apple pieces dipped in the syrup solution in the same manner as in the process of the invention were exposed to microwave irradiation having an output of 4.5 KW for 3 minutes under the condition of about 1330 to 3990 pascals (about 10 to 30 Torr) in pressure and of not more than 30° C. in theoretical increase of temperature, whereby the water content was reduced to about 20 wt%. However, serious scorching was observed at that point, and further processing had to be stopped.

The results of organoleptic tests on the dried apple pieces produced by the aforementioned three processes are shown in Table 2. In Table 2, the product by the process of the invention is denoted by I, the product according to the conventional freeze-drying process is denoted by II, and the product according to the conventional reduced pressure microwave drying process is denoted by III.

TABLE 2

|  | Appearance | Shape | Touch | Taste & Flavour | Remarks |
|---|---|---|---|---|---|
| I | 5 | 5 | 5 | 5 | Most Favourable as Snack Fruit |
| II | 5 | 5 | 2 | 5 | Having a texture like FU (Wheat-gluten Bread) |
| III | 1 | 1 | 1 | 1 | Having no Commercial Value, with Serious Scorching |

The standards for evaluations set forth in Table 2 are as follows:

|  | Evaluation | 5 | 1 |
|---|---|---|---|
| Appearance | Extent of Scorching | None | Serious |
| Shape | Extent of Loss in Volume Due to Drying | None | Serious |

-continued

| Evaluation | 5 | 1 |
|---|---|---|
| Touch | Texture Suited for Snack Fruit | Most Favorable | Least Favourable |
| Taste & Flavour | Flesh Fruit-Like Taste and Flavour | Retained Substantially | Serious loss |

As will be apparent from the results of comparison experiments, the dried apple product prepared through the process of the invention as defined in the appended claims is most favourable as a snack fruit. The equivalent results were obtained by processing other foods.

As will be appreciated by referring to the foregoing description, the snack foods prepared in accordance with the process of the invention are swelled to the proper extent while substantially retaining the original contours to give light and crispy touch when restored for eating. The products processed throgh the process of the invention are, thus, very favourable as snack foods. A further advantage of the process of the invention is that the foods are swelled and dried at a relatively low temperature under a reduced pressure to prevent volatilization of tasty and flavoursome ingredients and also prevented from deterioration in quality due to minimal heating. Accordingly, the prepared snack foods, according to the process of the invention, retain a taste and flavour substantially comparable to those prior to processing.

EXAMPLE 3

Using the apparatus shown in FIG. 2, banana was swelled and dried under reduced pressure. The banana was sliced into pieces each having a thickness of about 5 mm which were put on the shelf 4, in the drying chamber 1, in a single layer, and the lid 2 closed. The vacuum pump 11 was operated while maintaining the cock 9 in the closed position to evacuate the vacuum chamber 7 to a pressure of about 30 pascals (about 0.22 Torr). After the completion of the aforementioned operations, the cock 9 was opened while maintaining the cock 16 in the closed position, whereupon the pressure in the drying chamber reached about 160 pascals (about 1.2 Torr) within one second. The pressure in the drying chamber 1 was reduced immediately by means of the vacuum pump 11 to 30 pascals, and maintained at that pressure until the completion of a drying step. The banana slices were allowed to stand under that pressure for 30 minutes, and the infrared ray lamp (100 V, 185 W, Distance: 10 cm) was turned on to irradiate the banana slices until the temperature thereof reached about 30° C. Thereafter, the cock 9 was closed and the vacuum pump 11 was stopped, and the cock 16 opened slowly to return the pressure in the drying chamber to the atmospheric pressure. Then the lid 3 was opened, and the shelf 4 was inverted by rotating the handle 5 to remove the dried banana slices.

EXAMPLE 4

Process of the Invention

The lid 2 of the drying chamber 1 was opened, 100 g of fresh beef cut into this strips (30 mm×50 mm×5 mm) was put on the shelf 4 in the drying chamber and then the lid 2 was closed. The vacuum pump 11 was operated while maintaining the cock 9 in the closed position to evacuate the vacuum chamber 7 to a pressure of about 30 pascals (about 0.23 Torr). After the completion of aforementioned operations, the cock 9 was opened while maintaining the cock 16 in the closed position, whereupon air in the drying chamber 1 flowed thorugh the vacuum chamber 7 so that the pressure in the drying chamber was equalized with that in the vacuum chamber 7, at pressure of about 266 pascals (about 2 Torr). Then, the pressure in the drying chamber 1 was immediately reduced to about 40 pascals (about 0.3 Torr) and maintained at that pressure until the completion of the drying step. During that operations, the temperature of the fresh beef in the drying chamber 1 changed generally along the curve as shown in FIG. 1. After allowing the fresh beef to stand at that pressure for 60 minutes, the infrared ray lamp (100 V. 185 W, Distance: 10 cm) was turned on at the point shown by X in FIG. 1 to dry the fresh beef until the temperature thereof reached about 30° C. Thereafter, the cock 9 was closed and the vacuum pump 11 was stopped, and the cock 16 was opened slowly to return the pressure in the drying chamber 1 to the atmospheric pressure. The lid 3 was then opened and the shelf 4 was inverted by rotating the handle 5 to remove the dried beef.

Conventional Freese-Drying Process

After freezing 100 g of fresh beef cut into thin strips (30 mm×50 mm×5 mm) at − (minus) 40° C. at atmospheric pressure, the frozen beef was put on a heat conductor shelf maintained at 30° C. to freeze-dry it until the temperature of the beef reached 30° C. Thereafter, the dried beef was removed from the shelf.

Each of the dried beef samples prepared by the aforementioned processes was placed in a beaker, water added, and stood for 10 minutes. Then the beef samples were cooked with oil in a heated frying pan. The comparison items and the results are shown in Table 3.

TABLE 3

| Comparison Item | Process of the Invention | Conventional Freezed-Dry Process |
|---|---|---|
| (a) Appearance of Dried Beef | Dark Red | Light Red |
| (b) Condition after Restoration | Soft and Having a Color Resembling to the Color of Fresh Beef Prior to Drying | Becoming Appreciably Softer with Whitish Color |
| (c) Condition of Water Used for Restoration | Transparent with Little Coloring by Blood | Somewhat Cloudy with Appreciable Coloring by Blood |
| (d) Touch and Taste after | Rich in Resiliency Free of Sloopy Taste | Soft but Fragile, Having Sloppy Taste |

In Table 3, the comparison set forth in Item (a) was done for the clarification of the difference in appearance of the dried fresh beef depending on the difference in processing means for drying; the comparison set forth in Item (a) was done for the clarification of the difference in condition after restoration of the dried fresh beef depending on the difference in processing means for drying; the comparison set forth in Item (c) was done for the clarification of dissolved beef ingredients during the restoring step; and the comparison set forth in Item (d) was done for clarification of the touch and taste after restoration and cooking.

It can be appreciated, by comparing the results shown in Table 3, that the effects of the invention actually demonstrated after the restoration of the aforementioned two kinds of dried fresh beef are remarkable. Similar results are obtainable when solid foods other than fresh beef are processed through the process of the invention.

As should be understood from the foregoing, the dried foods prepared through the process of the invention are swelled to a proper extent while retaining the original condition substantially, so that they may be restored completely and substantially uniformly within a relatively short time by the addition of hot water or equivalent means to have the texture and taste substantially uncharged from or approximate to the original foods prior to processing. It may be also said that the cooked foods prepared from the restored materials obtained from the dried foods according to the invention have the texture and taste which are not changed from or approximate to the original foods without processing through the drying steps of the invention. Furthermore, since the foods are swelled and dried, according to the invention, at a relatively low temperature under a reduced pressure, deterioration in quality of the food can be minimized.

Moreover, the dried foods prepared through the process of the invention may serve as snack foods without subjecting them to the restoration operations.

EXAMPLE 5

100 g of eggroll (10 mm×40 mm×20 mm) having a temperature of about 60° C. was placed in a chamber, and the pressure of the chamber was reduced to about 53.3 pascals (about 4 Torr) within about one second. After holding the eggroll at that pressure for 30 minutes, the eggroll was dried with the temperature thereof being raised at a rate of 30° C./hr until it reached 80° C. The thus prepared dried eggroll was dipped in hot water for 3 minutes, and drained, to be restored with a taste, flavour and texture resembling those of an eggroll not subjected to the drying process.

What is claimed is:

1. A process for drying a food under a reduced pressure, comprising the steps of:
   (a) placing said food to be dried in an environment of reduced pressure low enough for freezing water contained in said food thereby to vaporize a portion of said water and to freeze the balance of said water by the action of the heat absorbed by vaporization;
   (b) heating the thus frozen food for drying it; and
   (c) returning the environment surrounding said food back again to the atmospheric pressure.

2. The process as claimed in claim 1, wherein said reduced pressure at the step (a) is lower than about 611 pascals.

3. The process as claimed in claim 1 or 2, wherein the water content in said food is not less than 50%, by weight, relative to the weight of said food.

4. The process as claimed in claim 1, wherein 10 to 60%, by weight, of said water content, relative to the weight of the water content originally contained in said food under untreated condition, is vaporized at the step (a).

5. The process as claimed in claim 1, wherein said environment of reduced pressure low enough for freezing water is said food at the step (a) is created by rapidly decompressing the environment to a pressure at which the boiling point of water reaches a temperature lower than the temperature of said food at a pre-set stage within the step (a) thereby to swell said food substantially.

6. The process as claimed in claim 5, wherein the environment surrounding said food is rapidly decompressed at the step (a) to a pressure low enough for freezing at least a portion of said water contained in said food.

7. The process as claimed in claim 5, wherein the environment surrounding said food is slowly decompressed until the pressure therein reaches a level at which the boiling point of water is lowered to a temperature substantially equal to the temperature of said food, and thereafter the pressure in the environment surrounding said food is rapidly reduced to a level at which the boiling point of water is lowered to a temperature lower than the temperature of said food.

8. The process as claimed in claims 5, 6 or 7, wherein the pressure of the environment surrounding said food is reduced rapidly within about one second to a level at which the boiling point of water is lowered to a temperature lower than the temperature of said food.

9. The process as claimed in claim 1, wherein the pressure of the environment surrounding said food is reduced during step (a) to a level at which the boiling point of water is lowered to a temperature lower than the temperature of said food at least by or equal to about 5° C.

10. The process as claimed in claim 1, wherein the temperature of said food prior to the processing or under untreated condition is in the range of from about 5° C. to about 100° C.

11. The process as claimed in claim 1, wherein said food is any vegetable, fruit, thermally denaturalized cereal or mixture thereof.

12. Dried foodstuffs made of any one or more vegetable, fruit or thermally denaturalized cereal, the foodstuffs being dried under reduced pressure while being allowed to swell by treating the same through a process which comprises the steps of placing said foodstuffs to be dried in an environment of reduced pressure low enough to vaporize a portion of water contained in the food and to freeze the balance of said water by the absorption of heat in the evaporation, the step of heating the thus frozen food to dry it, and the step of returning the environment surrounding said foodstuffs back again to the atmospheric pressure.

* * * * *